Feb. 10, 1931.    C. R. DAVIS    1,792,078
COMBINED SHELL AND SHIELD FOR AUTOMOBILE RADIATORS
Filed March 27, 1930
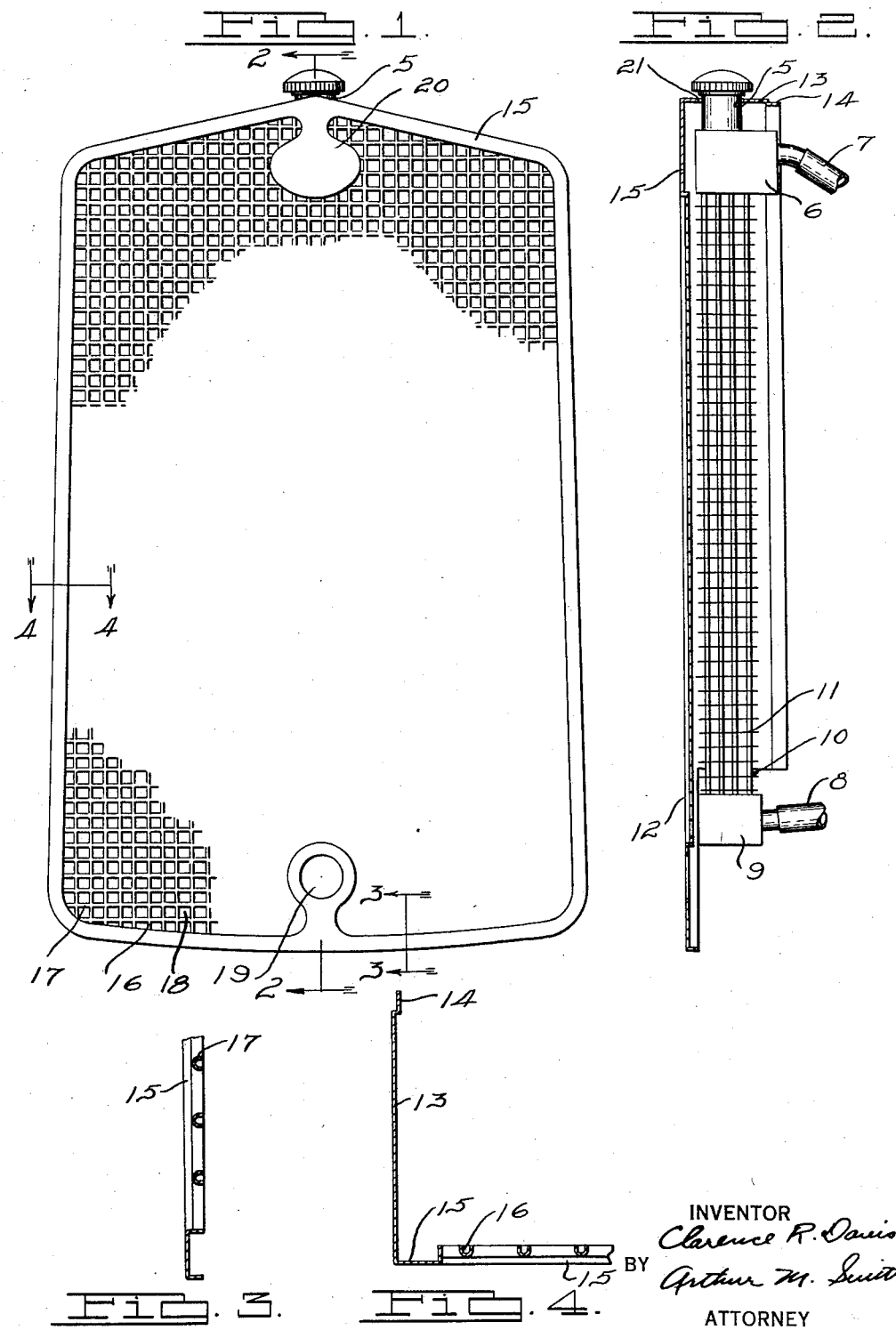
INVENTOR
Clarence R. Davis
BY Arthur M. Smith
ATTORNEY Patented Feb. 10, 1931

1,792,078

UNITED STATES PATENT OFFICE

CLARENCE R. DAVIS, OF DETROIT, MICHIGAN, ASSIGNOR TO DAVIS TOOL & ENGINEERING COMPANY, OF DETROIT, MICHIGAN, A CORPORATION OF MICHIGAN

COMBINED SHELL AND SHIELD FOR AUTOMOBILE RADIATORS

Application filed March 27, 1930. Serial No. 439,354.

My invention relates to a combined shell and shield for automobile radiators and particularly to such a combination shell and shield which may be formed from one sheet of metal by a stamping process, such as is set forth in my co-pending application for Letters Patent on a method of manufacturing shields for automobile radiators, Serial No. 439,355, filed March 27, 1930.

The value of a shield formed of a relatively tough metal to protect the thinner fins and tubes of an automobile radiator has heretofore been recognized. The cost of such a shield has, however, rendered impractical any general adoption of such shields by automobile manufacturers. In addition to the cost of such shields, considerable difficulty has been found in providing suitable means for fastening such shields in front of a radiator in such a manner that they will not rattle due to the vibrations in an automobile.

It is, therefore, an object of my invention to provide a combined shell and shield for automobile radiators which is inexpensive to manufacture and which, being formed from one piece of sheet metal, is integral with the shell of the radiator.

These, and various objects, features of arrangement, construction and operation, are plainly shown and described and will be best understood by reference to the accompanying drawings, wherein I have shown a preferred embodiment of my invention, in which Fig. 1 is a view in front elevation showing the combined shield and shell placed over the core of an automobile radiator;

Fig. 2 is a side elevation in partial cross section taken on the line 2—2 of Fig. 1;

Fig. 3 is a fragmentary cross sectional view taken on the line 3—3 of Fig. 1;

Fig. 4 is a fragmentary cross sectional view taken on the line 4—4 of Fig. 1.

Referring more in detail to the drawings, 5 designates the filling spout on the usual type of automobile radiator; 6 the upper water chamber of the radiator; 7 the upper conducting pipe; 8 the lower conducting pipe; 9 the lower water chamber; 10 the fins forming the radiator cooling surface; 11 the tubes for conducting the cooling medium from the lower water chamber 9, to the upper water chamber 6, in order to cool the cooling medium in the radiator. 12 designates my combined radiator shell and shield formed with a backwardly extending flange 13, which terminates in a depressed portion 14, for receiving the front portion of the automobile hood (not shown).

My combined radiator shell and shield consists of an outer frame portion 15, integral with which are a plurality of thin metal strips 16, running vertically, and a plurality of thin metal strips 17, running horizontally. The outer frame portion 15 is turned back on the sides sufficiently to form the flange 13. By proper stamping operations, as set forth in my co-pending application, Serial No. 439,355, filed March 27, 1930, the frame 15, the flange 13, the vertically extending strips of metal 16, and the horizontally extending strips of metal 17, may all be formed from a single piece of sheet metal.

As shown in Fig. 3, the horizontally extending strips 17, are so formed as to present from the front a rounded surface which simulates the appearance of wire, and are depressed to such an extent that the frame 15 protrudes slightly in front of the said strips 17.

As shown in Fig. 4, the vertically extending strips of metal 16 also are formed to present a rounded front surface which simulates the appearance of wire, and are depressed to such an extent that the frame member 15 protrudes slightly in front thereof. As shown in this view, the frame member 15 is bent at right angles to form the backwardly extending flange 13, which terminates in the depressed portion 14.

The square surfaces, which I have designated as 18 in Fig. 1, are formed between the vertically extending strips of metal 16, and the horizontally extending strips of metal 17, and are removed from the finished shield portion so as to present an open grille work consisting of the vertically extending strips of metal 16 and the horizontally extending strips of metal 17. The circular portion 19 is punched from the frame member 15 to provide access for the crank to start the automobile engine whenever this becomes necessary.

The frame member 15 is formed at the top with a smooth raised portion 20, which provides a place for fastening on the name plate of the automobile manufacturer.

As shown in Fig. 2, the upper portion of the frame member 15 is provided with an opening 21, to allow the filling spout 5 to project above the combined radiator shell and shield 12.

When the combined shell and shield have been thus formed, it is placed over the core of the automobile radiator and is fastened in place by the usual means for fastening the shell of a radiator to the automobile.

It will thus be seen that I have provided a combined shell and shield for an automobile radiator which provides for the protection of the radiator core, and which is ornamental in appearance, and only slightly more expensive to manufacture than a shell alone.

While I have illustrated and described one embodiment of my invention, it is apparent that various changes may be made as to the form of this combined radiator shell and shield. These and many other modifications may be made without departing from the spirit of my invention and I do not wish to be limited to the precise details of construction as herein set forth, but desire to avail myself of all changes within the scope of the appended claims.

Having thus described my invention, what I claim as new and desire to secure by Letters Patent of the United States, is:

1. A combined shell and shield for automobile radiators, comprising a frame portion, a rearwardly extending flange integral with said frame member, and a screen grille integral with said frame portion.

2. A combined shell and shield for automobile radiators, comprising a frame portion, a rearwardly extending flange portion integral with said frame portion, and a meshed grille portion rigidly secured to said frame portion.

3. A radiator shell comprising a frame portion, a rearwardly extending flange portion integral with said frame portion, and a coarse mesh screen grille non-detachably secured to said frame portion whereby said grille may not be removed without removing said shell.

4. A radiator shell comprising an outer frame portion, a rearwardly extending flange portion, and a coarse mesh screen grille rigidly secured to and integral with said outer frame portion.

In witness whereof, I hereunto subscribe my name this 11th day of March, 1930.

CLARENCE R. DAVIS.